Patented Sept. 18, 1945

2,385,172

UNITED STATES PATENT OFFICE 2,385,172

METHOD OF COAGULATING EMULSION POLYMERIZATES

Byron M. Vanderbilt, Cranford, and Nathan S. Beekley, Jr., Westfield, N. J., assignors, by mesne assignments, to Jasco, Incorporated, a corporation of Louisiana No Drawing. Application November 9, 1940, Serial No. 365,012

13 Claims. (Cl. 260—23)

This application relates to plastic, elastic, synthetic polymers of the general type of synthetic rubber-like substances; relates particularly to polymerization processes for producing the polymers; and relates especially to methods for precipitating and coagulating the polymer from the emulsion form in which it is produced.

Various synthetic rubber-like substances, commonly known as the "bunas," have been produced in the prior art by the polymerization of butadiene. Of these substances, "Perbunan" and "Buna-S" are the two more important ones. They are produced by a polymerization reaction, preferably applied in emulsion form to unsaturates such as butadiene and other conjugated diolefins, and to mixtures of butadiene with other unsaturated substances such as with acrylonitrile, with styrene, with vinyl naphthalene, with vinyl ketones, with vinyl esters, with acrylate esters and with other unsaturated materials capable of interpolymerizing when emulsified with water. These substances or mixtures are polymerized or interpolymerized by preparing them as emulsions, preferably by the vigorous agitation of the unsaturates with water in the presence of an emulsifying agent such as a soap, or salts of alkyl sulfates, or alkylated naphthalene sulfonates, or proteins, or the like, and allowing the polymerization to proceed either during simple storage, or during vigorous mechanical mixing, either at ordinary room temperature or at elevated temperatures. The polymerization preferably is facilitated by the addition to the mixture of a polymerization catalyst such as a peroxide or a per salt such as benzoyl peroxide or hydrogen peroxide or ammonium persulfate. At the close of a substantial time interval, the polymerization mixture becomes a "latex" or emulsion containing the rubber-like polymer or interpolymer of the two or more unsaturated materials.

For most purposes, it is necessary that this emulsion be broken or coagulated in order to obtain the polymer in the desired coherent form, substantially free from water, and free from unpolymerized materials, catalyst and other impurities. In the past, it has been customary to use considerable quantities of acid to coagulate and precipitate the emulsion or "latex," but this procedure is unsatisfactory for various reasons. The relatively large quantity of acid required for the precipitation is harmful to the physical characteristics of the polymer, and is injurious to the polymerization equipment, especially if sulfuric or hydrochloric acid is used. Acetic acid, which is very often employed for the coagulation, is the least harmful of the several available acids, both to the physical characteristics of the polymer and to the reaction equipment, but it is unduly expensive. Also, the acid reacts chemically with most of the satisfactory emulsifying agents, particularly with the soaps, converting them into free fatty acids which are insoluble in water and are precipitated with the polymer. Most of the free fatty acids, particularly if present in substantial quantities, are harmful to the quality of the polymer, reducing its physical characteristics after vulcanization with sulfur, and therefore, a difficult and expensive extraction step with solvent is required to remove such free fatty acid. Also, such acids precipitate the polymer from the emulsion in the form of large coherent masses which are difficult and expensive to wash and process, and which suffer substantial injury in the course of the necessary processing.

In place of the acid precipitation, it has been suggested that the precipitation and coagulation be obtained through the use of various salt solutions, especially sodium chloride brine, but these salt solutions are unsatisfactory because of the relatively large quantities required, and the fact that they tend to precipitate the emulsions in the form of coagulates of such physical characteristics that they are difficult to wash, dry and process.

The present invention consists broadly in the precipitation and coagulation of a latex of olefinic polymer by the application thereto of a combination of substances consisting mainly of a water-soluble salt, such as sodium chloride brine in combination with a weak acid such as carbon dioxide.

When olefinic polymers, such as polybutadiene or the interpolymer of butadiene with acrylonitrile, or styrene or other similar synthetic rubber-like substances, are synthesized by emulsion polymerization using fatty acid soaps as emulsifiers and peroxide substances as catalysts, the pH value or acidity (or alkalinity) is preferably maintained in the range of 8.4 to 8.8 although hydrogen ion values as high as 10 or 11 may in some cases be advantageously utilized. When such emulsions are treated with a saturated solution of an inorganic salt such as sodium chloride, sodium sulfate, or ammonium acetate, several volumes of the salt solution per volume of emulsion are required to obtain a reasonably complete precipitation of the polymer, and when so precipitated, the physical condition of the precipitate or coagulate is unsatisfactory because of its finely divided character and the difficulty of washing it to remove undesirable impurities and subsequently drying it.

The present invention is based upon the discovery that when a polymer emulsion is treated with carbon dioxide, and then treated with a water solution of a soluble salt, a relatively very small amount of the salt solution is sufficient to precipitate all of the polymer. Furthermore, the polymer may be precipitated substantially without contamination by free fatty acid from the soap, and by control of the amount of brine and carbon dioxide present, a highly advantageous physical form of coagulate is readily obtained. Thus, in comparison to salt solution alone, of which three or more volumes of brine are required per volume of emulsion and the precipitation is incomplete, the coagulate contaminated and the physical condition poor, the addition of carbon dioxide to the latex in combination with the brine solution results in a complete precipitation of the polymer by the addition of from $\frac{1}{10}$ to one volume of brine solution per volume of emulsion, and the resulting coagulate is free from water insoluble contaminants and is in the form of coarse particles which are particularly easy to wash free from brine, catalyst, and emulsifying agent.

Carbon dioxide in solution in water may be regarded as an acid, but it is so weak an acid as to be ineffective for the coagulation and precipitation of the emulsion. Furthermore, it does not attack the common metals nor does it readily react with the emulsifying soaps to liberate the free fatty acids.

It may be noted that carbon dioxide has an ionization constant less than $10^{-6}$, and it is intended when speaking of carbon dioxide that it shall be regarded as representative of a group of weak acids having ionization constants less than approximately this value of $10^{-6}$.

The process of the invention is particularly applicable to alkaline polymerizing emulsions and is particularly applicable to emulsions made with the water-soluble soaps. It is not, however, applicable to emulsions having a pH below 7, such as those containing acid type emulsifiers including the alkyl amine salts, or the cation active emulsifiers of the quaternary ammonium type and the like.

The use of carbon dioxide as a coagulant aid is not limited to the combination with a salt solution, but is equally efficient with other means of precipitation, including the freezing out of the polymer and electrical precipitation.

When the emulsifier consists of a salt of a fatty acid, the size of the particles obtained during the coagulation step is readily controlled by adjustment of the hydrogen ion value prior to the addition of the brine. When an emulsion or latex having a pH value of 8.6 or higher is salted out by the application of brine solution, the coagulate consists of the above mentioned very fine particles which are difficult to wash and are unsuitable for drying and are usually very unsatisfactory. On the other hand, lower hydrogen ion values result in coarser grains of coagulates. If the latex prepared from a mixture of butadiene and acrylonitrile with sodium oleate as the emulsifying agent and benzoyl peroxide as the catalyst is saturated with carbon dioxide and then treated with a small quantity of saturated sodium chloride solution, the resulting precipitate is in the form of large lumps, which tend to be contaminated with both soap and free oleic acid. If, on the other hand, only small quantities of carbon dioxide are used, such that the hydrogen ion value of the latex or emulsion lies in the range between about 7.8 and 8.4, the precipitate formed upon the addition of the brine consists of relatively coarse particles which are particularly suitable for the subsequent washing and drying processes. By proper regulation of the pH of the emulsion or latex by means of $CO_2$ prior to coagulation with sodium chloride or other neutral salt solutions, the rubber-like material can be precipitated in any particle size desired. However, different emulsions or latices precipitate in different particle size depending upon the emulsifying agent present. At a given pH, latices containing sodium stearate coagulate in finer particle size than those containing sodium oleate as emulsifier. Those containing a neutral type emulsifier, such as sodium lauryl sulfate, require even a lower pH.

Thus, an object of the invention is to precipitate and coagulate an emulsion or latex of synthetic rubber by the application thereto of carbon dioxide and a water-soluble salt in combination. Although the carbon dioxide is preferably added prior to the addition of the salt by bubbling the gas into the emulsion or latex, the $CO_2$ may be added simultaneously with the salt or even after partial or complete precipitation by the salt.

Other objects and details of the invention will be apparent from the following description.

In preparing the emulsion of synthetic rubber, a mixture consisting of 100 parts of butadiene may be prepared with from 0 parts to 200 parts of acrylonitrile, styrene, vinyl naphthalene, methyl methacrylate or the like; from 100 parts to 1000 parts of water; from 1 part to 100 parts of a suitable emulsifying agent such as sodium oleate, or ammonium stearate, or sodium lauryl sulfate, or potassium isopropyl naphthalene sulfonate or the like, together with 0.1 part to 20 parts of a peroxide type catalyst such as benzoyl peroxide, or potassium persulfate, or hydrogen peroxide, or oxygen, or ozone, or organic peroxides in general. The polymerization may be continued at temperatures ranging from 20° to 75° C. for a time interval ranging from 2 to 100 hours. At the close of this polymerization reaction, a latex or emulsion is obtained which may contain from 10% to 50% of the synthetic rubber-like polymer.

When this emulsion has been completely polymerized, it is customary to "strip" from it any unreacted monomers of the original olefins. This may conveniently be accomplished by distillation, or by steam stripping, or by the passage through the solution of a current of air or inert gas at an elevated temperature, or by other appropriate means. Thus, while the acrylonitrile is water-soluble, an alcohol or other organic solvent is required to remove the unreacted styrene or unreacted butadiene, although in view of the low boiling point of butadiene, it is usually readily distilled merely by reducing the pressure upon the reaction mixture. It is usually desirable that unreacted materials be removed before the emulsion is precipitated, since the removal of such unreacted materials improves the quality of the precipitated polymer.

*Example 1*

According to the prior art, this emulsion with a pH of 8.5 to 9.0 may be precipitated by the addition thereto of sodium chloride brine. Two volumes of saturated brine per volume of emulsion precipitates the major portion of the polymer, but it is in such finely divided form that a large portion is lost in further washing and handling processes.

Example 2

According to the present invention, 1 volume of the latex or emulsion as above described was treated with carbon dioxide until a hydrogen ion value of 8.0 was obtained. No precipitation occurred at this stage. Thereafter, ½ volume of saturated sodium chloride brine was added, a complete precipitation of the polymer occurred and the precipitate or coagulate was in the form of large particles which were easy to wash and process.

Example 3

One volume of the latex or emulsion prepared as above described was substantially saturated with carbon dioxide until a hydrogen ion value of 6.5 was obtained. 42/100 part by volume of saturated sodium chloride brine was required to precipitate and coagulate the latex. The coagulate was obtained in the form of good sized, coherent lumps.

Example 4

One part by volume of the latex prepared as above described was treated with carbon dioxide until a hydrogen ion value of 8.2 was obtained. 66/100 part by volume of saturated sodium chloride brine was sufficient to give a complete precipitation, and the coagulate was obtained in the form of coarse particles approximately 1 to 2 millimeters in diameter which were easily washed free of emulsifier and brine merely by spraying with water and were readily dried in a current of air on open trays.

Example 5

An emulsion or latex prepared as above described, with a somewhat smaller amount of water, so as to contain approximately 35% by weight of the emulsified polymer, stabilized by sodium oleate and having a hydrogen ion value of 9.5 was found to require approximately 2.5 volumes of saturated sodium chloride brine per volume of latex in order to give a reasonably satisfactory precipitation of the polymer. A similar volume of the emulsion was treated with carbon dioxide and the hydrogen ion value lowered to 8.2. When so treated, 0.75 volume of the saturated brine solution was then required per volume of emulsion to precipitate the polymer, and the precipitate was obtained in the form of highly advantageous coarse particles.

Example 6

A polymer emulsion was prepared by mixing 30 parts of acrylonitrile, 70 parts of butadiene, approximately 200 parts of water, 4 parts of the sulfated long carbon chain amide sold under the trade name of "Igepon T" and 0.2 part of hydrogen peroxide. This mixture was stirred for a time interval of approximately 20 hours at an elevated temperature of about 40° C. A portion of the resulting latex was acidified with acetic acid in the proportion of 20 parts of 10% acetic acid per 100 parts of emulsion and the mixture cooled to —10° C. and held at that temperature for several hours. The coagulum was tough and coherent with considerable quantities of contaminating occluded acid, emulsifier and unreacted acrylonitrile. In order to remove these contaminants, it was found necessary to wash the material for a prolonged period of time on a corrugated roll mill. Another portion of the same latex was saturated with carbon dioxide and likewise cooled to —10° C. and held at that temperature for a short time. The resulting coagulant was found to be coarsely granular and of a particularly advantageous particle size such that it was necessary only to wash the coagulate by spraying water on it to remove substantially all of the adherent liquid prior to compounding and vulcanizing.

Example 7

A similar latex (prepared as above described from a mixture of acrylonitrile and butadiene with 2½% of sodium stearate in the water phase as emulsifier and benzoyl peroxide as catalyst with a hydrogen ion value of 8.7) was precipitated by means of the above mentioned 2½ to 3 volumes of saturated sodium chloride solution per volume of polymer emulsion, in the form of a very fine powder. This powdery precipitate was found to be extremely difficult to wash free from sodium stearate due to passage of the solid material through ordinary filter cloth and in part because of the large "hold-up" of wash water by the finely divided polymer. A similar quantity of the same latex was treated with carbon dioxide to adjust the hydrogen ion value at 8.3 and sufficient brine solution, approximately 1 volume per volume of emulsion was added to precipitate the polymer in a relatively large particle size of approximately 0.5 to 2 millimeters in diameter. This coagulate required less than half as much wash water as the other coagulate to free it of soap and salt. A third portion of the emulsion was treated with carbon dioxide to bring the pH value to 7.0, and approximately ½ volume of salt solution per volume of emulsion was required to precipitate the polymer. At this hydrogen ion value, a small portion of the soap was precipitated as stearic acid. The remaining soap was removed by washing with water and it was found that approximately 1% of stearic acid remained with the coagulate and was found to be valuable as an accelerator in the subsequent vulcanization of the polymer. A fourth portion of the same emulsion was precipitated by the addition of an excess of acetic acid, bringing the hydrogen ion value to approximately 3. This precipitated all of the polymer, and substantially all of the soap was destroyed and the stearic acid liberated. This liberated large quantity of stearic acid remained in the polymer and produced a harmful decrease in the desirable physical characteristics of the material after vulcanization with sulfur. The addition of limited quantities of acetic acid to a fifth portion of the latex to bring the hydrogen ion value to 7.0 resulted in a partial coagulation of the emulsion and the liberation of a substantial part of the stearic acid from the soap of the latex by the addition of brine. On subsequent coagulation of the remainder, it was found that it was difficult to wash out the sodium stearate remaining and the stearic acid liberated was in excess of that required for optimum results when compounding and vulcanizing the copolymer obtained.

It is further found that proper control of the hydrogen ion value of the mixture during the polymerization process is similarly very important, especially since the hydrogen ion value tends to be unduly high with most of the suitable emulsifying agents. Since carbon dioxide does not precipitate the emulsion, the hydrogen ion value may readily be controlled and adjusted to the optimum value by the addition of carbon dioxide in limited quantities sufficient to bring the hydrogen ion value to the desired point. This is particularly advantageous, in view of the fact that some of the more desirable fatty acid substances are relatively insoluble in water, and vigorous agitation is required to obtain the desired dispersion. Since too vigorous agitation may break the latex, the addition of a high molecular weight fatty acid, such as stearic acid, in order to lower the pH of sodium stearate emulsions is undesirable. For these reasons, adjustment of the hydrogen ion value by the use of carbon dioxide instead of a fatty acid or an inorganic acid is especially desirable. Thus, in the preparation of synthetic rubber-like polymers and interpolymers, carbon dioxide can be advantageously used for two purposes, the adjustment of the hydrogen ion value during polymerization to the optimum point and the facilitation of the coagulation of the emulsion after the completion of the polymerization. Furthermore, carbon dioxide has no tendency to precipitate the emulsion during the polymerization procedure and does not poison the polymerization reaction, being thereby in sharp contrast to the acetic acid and the mineral acids which tend to coagulate the emulsion during the polmerization reaction and may seriously harm the polymerization procedure.

The invention is not limited to carbon dioxide, but any other of the comparably weak acids may be used. Thus, hydrogen sulfide similarly aids the precipitation of the latex prior to the application of brine, although its use is less desirable because of the objectionable odor; and larger quantities are required. Similarly, hydrocyanic acid is equally useful, although with this also larger quantities are necessary because of its weaker character and it is less desirable because of the highly poisonous character. Other weakly acid substances, such as aminoacids, may also be employed.

Since the quantity of carbon dioxide required for the coagulation procedure is relatively small, the carbon dioxide may conveniently be obtained from a drum or cylinder of the liquefied gas from which source gas of relatively high purity is obtainable. It is not, however, necessary that material of such high purity be used, since flue gases are equally usable either as such since the addition of small quantities of soot or ash does no harm to the cured polymer, and the presence of nitrogen, oxygen or carbon monoxide is not harmful; or the flue gases may be purified to any convenient extent before use.

In the subsequent processing of the polymer for use as a rubber substitute, it is usually customary to incorporate into the polymer a substantial quantity of inert filler such as carbon black, and sulfur for vulcanization. Also, it is customary to add to the polymer substantial quantities of vulcanization aids or accelerators, and other substances suitable for improving the physical characteristics of the vulcanized polymer, including zinc oxide, and especially stearic acid. However, the amount of stearic acid required is relatively quite small, and if undue amounts of stearic acid are added, the vulcanized polymer is harmed. In the prior art, if a stearic acid soap is used for the emulsifying agent and the "latex" precipitated with acid, substantially all of the stearic acid from the emulsifying agent is precipitated with the polymer, and the amount of stearic acid soap required to obtain a satisfactory emulsion is such that if all of the stearic acid is precipitated with the coagulate, the quantity is much too great for the production of a satisfactory vulcanizate. It is found, however, that small and predetermined amounts of stearic acid can be precipitated by the carbon dioxide. It is, also, found that if a 5% solution of sodium stearate is treated with a current of carbon dioxide bubbled through the solution for a considerable length of time, about 65% of the sodium stearate is converted into stearic acid and precipitated. By regulation of the concentration of the carbon dioxide, that is, by adjustment of the hydrogen ion and by proper selection of the time of reaction, the desired proportion of the stearic acid in the sodium stearate soap emulsifier can be liberated up to about 65% of the original quantity. Thus, the desired amount of stearic acid for aiding the vulcanization and milling of the polymer may be included in the precipitated polymer, and this is another advantageous feature of the present invention.

Thus, the process of the invention consists in the preparation of latices of olefinic polymer material and the precipitation and coagulation of that latex into coarse, easy to wash, pure granules by the application to the latex of carbon dioxide and a salt solution.

The invention is not, however, limited to the combination of carbon dioxide or other weak acid, as above disclosed, with neutral salt solution, since the invention may equally well consist of carbon dioxide and relatively small quantities of acid or acid salts. Likewise, the invention, while particularly applicable to polymers of butadiene with or without other interpolymerized substances, is equally applicable to natural rubber and other emulsions of rubber-like substances in water emulsion.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. In the preparation of synthetic rubber by the steps of mixing a conjugated diolefin with an emulsifying agent, a polymerization catalyst and water at a pH of 7 and above, the step of precipitating the polymerized emulsion by the application thereto of carbon dioxide and a neutral to acid salt.

2. In the preparation of a synthetic rubber by the polymerization at a pH of 7 and above of an emulsion of butadiene and a second unsaturate containing a single C=C linkage and capable of forming copolymers with butadiene in water with an emulsifying agent and a peroxide catalyst, the step of precipitating the emulsion of polymer comprising adjustment of the hydrogen ion value by the addition of limited quantities of a weak acid having an ionization constant less than $10^{-6}$ and a neutral to acid salt.

3. In the preparation of a synthetic rubber by the polymerization at a pH of 7 and above of an emulsion of butadiene and acrylonitrile in water with an emulsifying agent and a peroxide catalyst, the step of precipitating the emulsion of polymer comprising adjustment of the hydrogen ion value by the addition of limited quantities of a weak acid comprising carbon dioxide and a solution of sodium chloride.

4. In the preparation of a synthetic rubber by the polymerization at a pH of 7 and above of an emulsion of butadiene and acrylonitrile in water with an emulsifying agent and a peroxide catalyst, the step of precipitating the emulsion of polymer comprising adjustment of the hydrogen ion value by the addition of limited quantities of a weak acid having an ionization constant less than $10^{-6}$, and adding a water soluble substantially neutral salt.

5. In the preparation of a synthetic rubber by the polymerization at a pH of 7 and above of an emulsion of butadiene and styrene in water with an emulsifying agent and a peroxide catalyst, the step of precipitating the emulsion of polymer comprising adjustment of the hydrogen ion value by the addition of limited quantities of a weak acid comprising carbon dioxide and a brine solution comprising sodium chloride.

6. The method of coagulating an emulsion of rubbery substances having a pH of 7 and above prepared by the polymerization of a conjugated diolefin in aqueous emulsion comprising the steps of adjusting the hydrogen ion value of the emulsion by the addition thereto of limited quantities of a weak acid comprising carbon dioxide and thereafter completing the precipitation by the addition to the emulsion of a neutral to acid salt.

7. The method of coagulating an emulsion of rubbery substances having a pH of 7 and above prepared by the polymerization of a conjugated diolefin in aqueous emulsion using a salt of a fatty acid as emulsifier comprising the steps of adjusting the hydrogen ion value of the emulsion of rubbery substances by the addition thereto of limited quantities of a weak acid comprising carbon dioxide and thereafter completing the precipitation by the addition to the emulsion of a neutral to acid salt.

8. In the preparation of a synthetic rubber by the polymerization at a pH of 7 and above of an emulsion of butadiene and a second unsaturate containing a single C=C linkage and capable of forming copolymers with butadiene in water with an emulsifying agent and a peroxide catalyst, the step of precipitating the emulsion of polymer comprising the adjustment of the hydrogen ion value of the completed polymer emulsion by the addition thereto of limited quantities of a weak acid having an ionization constant less than $10^{-6}$, and an aqueous solution of a neutral to acid salt.

9. In the preparation of a synthetic rubber by the polymerization at a pH of 7 and above of an emulsion of butadiene and a second unsaturate containing a single C=C linkage and capable of forming copolymers with butadiene in water with an emulsifying agent and a peroxide catalyst, the step of precipitating the emulsion of polymer comprising the adjustment of the hydrogen ion value of the completed polymer emulsion by the addition thereto of limited quantities of carbon dioxide and an aqueous solution of a neutral to acid salt.

10. In the preparation of a synthetic rubber by the polymerization of a pH of 7 and above of an emulsion of butadiene and a second unsaturate containing a single C=C linkage and capable of forming copolymers with butadiene in water with an emulsifying agent consisting of sodium oleate, the step of precipitating the emulsion of polymer comprising the adjustment of the hydrogen ion value of the completed polymer emulsion by the addition thereto of limited quantities of a weak acid having an ionization constant less than $10^{-6}$, and an aqueous solution of a neutral to acid salt.

11. In the preparation of a synthetic rubber by the polymerization at a pH of 7 and above of an emulsion of butadiene and a second unsaturate containing a single C=C linkage and capable of forming copolymers with butadiene in water with an emulsifying agent consisting of sodium stearate, the step of precipitating the emulsion of polymer comprising the adjustment of the hydrogen ion value of the completed polymer emulsion by the addition thereto of limited quantities of a weak acid having an ionization constant less than $10^{-6}$, and an aqueous solution of a neutral to acid salt.

12. In the preparation of a synthetic rubber-like substance by the polymerization at a pH of 7 and above of an emulsion of butadiene and a second unsaturate containing a single C=C linkage and capable of forming copolymers with butadiene in water, the combination of steps of adding thereto an emulsifying agent comprising a stearate soap and a peroxide catalyst, and after the polymerization, the additional step in combination of precipitating the emulsion of polymer and the simultaneous precipitation of a portion of the stearic acid in the emulsifying agent comprising adjusting the hydrogen ion value of the emulsion by the addition thereto of limited quantities of carbon dioxide for a limited period of time, and the further step of the addition thereto of a water-soluble neutral salt.

13. In the preparation of a synthetic rubber by the polymerization of an emulsion of butadiene and styrene in water with an emulsifying agent and a peroxide catalyst, the step of precipitating the emulsion of polymer comprising adjustment of the hydrogen ion value between 8.0 and 8.8 by the addition of limited quantities of a weak acid comprising carbon dioxide.

BYRON M. VANDERBILT.
NATHAN S. BEEKLEY, Jr.